(12) United States Patent
Adachi et al.

(10) Patent No.: US 11,588,167 B2
(45) Date of Patent: Feb. 21, 2023

(54) FUEL CELL AND METHOD OF MANUFACTURING FUEL CELL

(71) Applicant: TOYOTA JIDOSHA KABUSHIKI KAISHA, Toyota (JP)

(72) Inventors: Makoto Adachi, Nagakute (JP); Makoto Ichikawa, Toyota (JP); Shogo Ohmori, Miyoshi (JP); Hiroshi Harada, Toyota (JP); Yu Ashitaka, Toyota (JP); Tsutomu Ochi, Miyoshi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 47 days.

(21) Appl. No.: 17/148,188

(22) Filed: Jan. 13, 2021

(65) Prior Publication Data

US 2021/0226241 A1 Jul. 22, 2021

(30) Foreign Application Priority Data

Jan. 17, 2020 (JP) .............................. JP2020-005729

(51) Int. Cl.
*H01M 8/1004* (2016.01)
*H01M 8/00* (2016.01)
*H01M 8/0273* (2016.01)
*H01M 8/04* (2016.01)
*C09J 9/02* (2006.01)

(52) U.S. Cl.
CPC ............. *H01M 8/1004* (2013.01); *C09J 9/02* (2013.01); *H01M 8/006* (2013.01); *H01M 8/0273* (2013.01); *H01M 8/04* (2013.01)

(58) Field of Classification Search
CPC .................................................. H01M 8/1004
See application file for complete search history.

(56) References Cited

U.S. PATENT DOCUMENTS

2014/0017590 A1\* 1/2014 Sugishita ............ H01M 8/0271
429/535

FOREIGN PATENT DOCUMENTS

JP 2015050137 A 3/2015
JP 2017091644 A 5/2017

\* cited by examiner

*Primary Examiner* — Brian R Ohara
(74) *Attorney, Agent, or Firm* — Hunton Andrews Kurth LLP

(57) ABSTRACT

A fuel cell includes: a membrane electrode assembly of a flat plate shape including an electrolyte membrane and an electrode catalyst layer, the membrane electrode assembly having a first side intersecting a flow pathway of a reactive gas on a surface of the fuel cell and a second side differing from the first side; a frame member of a flat plate shape including an opening part for arrangement of the membrane electrode assembly, the opening part having a first frame side corresponding to the first side and a second frame side corresponding to the second side; and an adhesive member for bonding between an outer periphery of the membrane electrode assembly and an inner periphery of the frame member. The thickness of the adhesive member in an area from an inner peripheral edge at the second frame side toward a center of the frame member may be greater than the thickness of the adhesive member in an area from an inner peripheral edge at the first frame side toward the center of the frame member.

3 Claims, 9 Drawing Sheets

FUEL CELL AND METHOD OF MANUFACTURING FUEL CELL

CROSS-REFERENCE TO RELATED APPLICATIONS

This application claims priority from Japanese patent application P2020-005729 filed on Jan. 17, 2020, the disclosure of which is hereby incorporated in its entirety by reference into this application.

BACKGROUND

Field

This disclosure relates to a fuel cell and a method of manufacturing a fuel cell.

Related Art

According to a known technique relating to a solid polymer fuel cell, a resin frame member and a solid polymer electrolyte membrane are bonded to each other with an adhesive (Japanese Patent Application Publication No. 2015-050137, for example).

An inappropriate thickness of the adhesive may cause a problem of failing to obtain a fuel cell having intended strength.

SUMMARY

According to one aspect of this disclosure, a fuel cell is provided. The fuel cell includes: a membrane electrode assembly having a flat plate shape, the membrane electrode assembly including an electrolyte membrane and an electrode catalyst layer, the membrane electrode assembly having a first side and a second side different from the first side, the first side intersecting a flow pathway of a reactive gas in a plane of the fuel cell; a frame member having a flat plate shape, the frame member including an opening part configured to arrange the membrane electrode assembly, the opening part having a first frame side corresponding to arrangement of the first side and a second frame side corresponding to arrangement of the second side; and an adhesive member configured to bond an outer periphery part of the membrane electrode assembly and an inner periphery part of the frame member. The thickness of the adhesive member in an area from an inner peripheral edge at the second frame side toward a center of the frame member may be greater than the thickness of the adhesive member in an area from an inner peripheral edge at the first frame side toward the center of the frame member. According to the fuel cell of this aspect, the adhesive member arranged at a position corresponding to the second side of the membrane electrode assembly has a greater thickness than the adhesive member arranged at a position corresponding to the first side of the membrane electrode assembly intersecting the flow pathway of the reactive gas in a plane of the fuel cell. This makes it possible to increase the strength of the second side of the membrane electrode assembly while reducing the occurrence of a hindrance to passage of gas in a plane of the fuel cell.

DETAILED DESCRIPTION

A. First Embodiment

Figure 1:
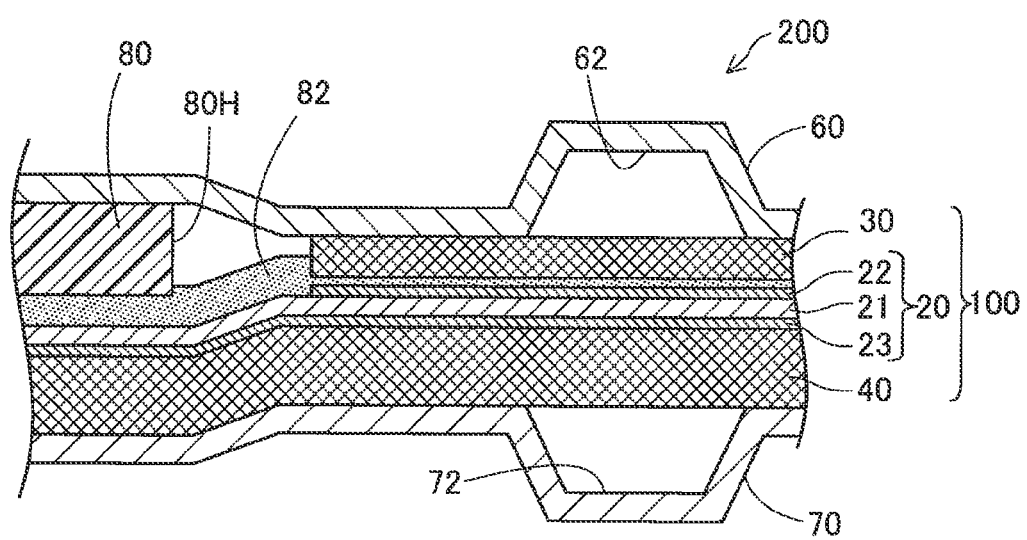
FIG. 1 is a cross-sectional view schematically showing a part of a fuel cell device of this disclosure.

FIG. 1 is a cross-sectional view schematically showing a part of a fuel cell device 200 according to a first embodiment of this disclosure. The fuel cell device 200 is a solid polymer fuel cell that generates power in response to supply of reactive gases that are hydrogen gas as a fuel gas and air as an oxidizing gas, for example. The fuel cell device 200 is formed by interposing a membrane electrode and gas diffusion layer assembly (also called "MEGA") 100 and a resin frame 80 between a cathode-side separator 60 with an oxidizing gas flow path 62 and an anode-side separator 70 with a fuel gas flow path 72. A single fuel cell device 200 shown in FIG. 1 is also called a fuel cell 200 or as a unit cell 200. The oxidizing gas flow path 62 functions as a flow path for the oxidizing gas on a cathode-side surface of the fuel cell 200, and the fuel gas flow path 72 functions as a flow path for the fuel gas on an anode-side surface of the fuel cell 200. A plurality of the fuel cell devices 200 may be stacked and used as a fuel cell stack in response to a requested output voltage.

The MEGA 100 functions as an electrode film of the fuel cell device 200. The MEGA 100 includes a membrane electrode assembly (MEA) 20, a cathode-side gas diffusion layer 30, and an anode-side gas diffusion layer 40. The membrane electrode assembly 20 includes an electrolyte membrane 21 of a flat plate shape, a cathode-side electrode catalyst layer 22 arranged on a surface of the electrolyte membrane 21 corresponding to a cathode, and an anode-side electrode catalyst layer 23 arranged on a surface of the electrolyte membrane 21 corresponding to an anode. In the following description, where distinction between the cathode-side electrode catalyst layer 22 and the anode-side electrode catalyst layer 23 is not required, these catalyst layers will also be called "electrode catalyst layers."

The electrolyte membrane 21 is an ion-exchange resin film made of ionomer and having proton conductivity. For example, fluorine-based resin such as Nafion (registered trademark) is used as the electrolyte membrane 21. The electrode catalyst layer is formed by drying electrode catalyst ink applied in a layer. The electrode catalyst ink is prepared using a catalyst support on which catalyst particles are supported, a solvent, and ionomer as main components, for example. For example, various types of carbon particles or carbon powder such as carbon black or carbon nanotubes are applicable to the catalyst support. As catalyst particles, platinum compounds such as a platinum-cobalt alloy and a platinum-nickel alloy are applicable as well as platinum, for example. Ionomer is an electrolytic material having proton conductivity and fluorine-based resin such as Nafion (registered trademark) is used as ionomer, for example.

Hot-pressing is used for bonding between the electrolyte membrane 21 and the electrode catalyst layer, for example. Hot-pressing is performed while the electrode catalyst layer cut out into a substantially rectangular shape (also called a sheet-like shape) is arranged on a corresponding surface of the electrolyte membrane 21. The cathode-side electrode catalyst layer 22 is cut out into an outer shape smaller than that of the anode-side electrode catalyst layer 23. As a result of the hot-pressing, the cathode-side electrode catalyst layer 22 is bonded to one surface of the electrolyte membrane 21 and the anode-side electrode catalyst layer 23 is bonded to the other surface of the electrolyte membrane 21, thereby forming the membrane electrode assembly 20.

The gas diffusion layers 30 and 40 are conductive members having gas diffusion properties. For example, carbon cloth made of nonwoven fabric or carbon paper is used as the gas diffusion layers 30 and 40. The cathode-side gas diffusion layer 30 is arranged on the outer surface of the cathode-side electrode catalyst layer 22, and the anode-side gas diffusion layer 40 is arranged on the outer surface of the anode-side electrode catalyst layer 23.

The resin frame 80 is a frame member of a flat plate shape and is used for sealing between the separators 60 and 70. For example, resin such as PE, PP, PET, or PEN is applicable to the resin frame 80. The resin frame 80 includes an opening part 80H formed at the center of the resin frame 80 in a plane direction for arrangement of the membrane electrode assembly 20. The resin frame 80 and the membrane electrode assembly 20 are bonded to each other with an adhesive 82. The adhesive 82 is applied to a cathode-side outer periphery of the membrane electrode assembly 20 to extend over a surface of the electrolyte membrane 20 and a surface of the cathode-side electrode catalyst layer 22. The adhesive 82 is an ultraviolet (UV) curing adhesive. For example, an adhesive containing polyisobutylene or butyl rubber is applicable to the adhesive 82. For smooth bonding between the membrane electrode assembly 20 and the resin fame 80, the viscosity of the adhesive 82 is preferably equal to or less than 30 Pa·s, for example. The cured adhesive 82 of the fuel cell device 200 will also be called an "adhesive member." If the thickness of the adhesive member in an area closer to the center than an inner peripheral edge of the resin frame 80 is greater than the thickness of the cathode-side gas diffusion layer 30 or that of the resin frame 80, for example, pressure loss in the oxidizing gas flow path 62 may be increased, and this may cause a hindrance to passage of the oxidizing gas. The "area closer to the center than the inner peripheral edge of the resin frame 80" means an area closer to the center of the resin frame 80 in the plane direction than the inner peripheral edge of the resin frame 80.

Figure 2:
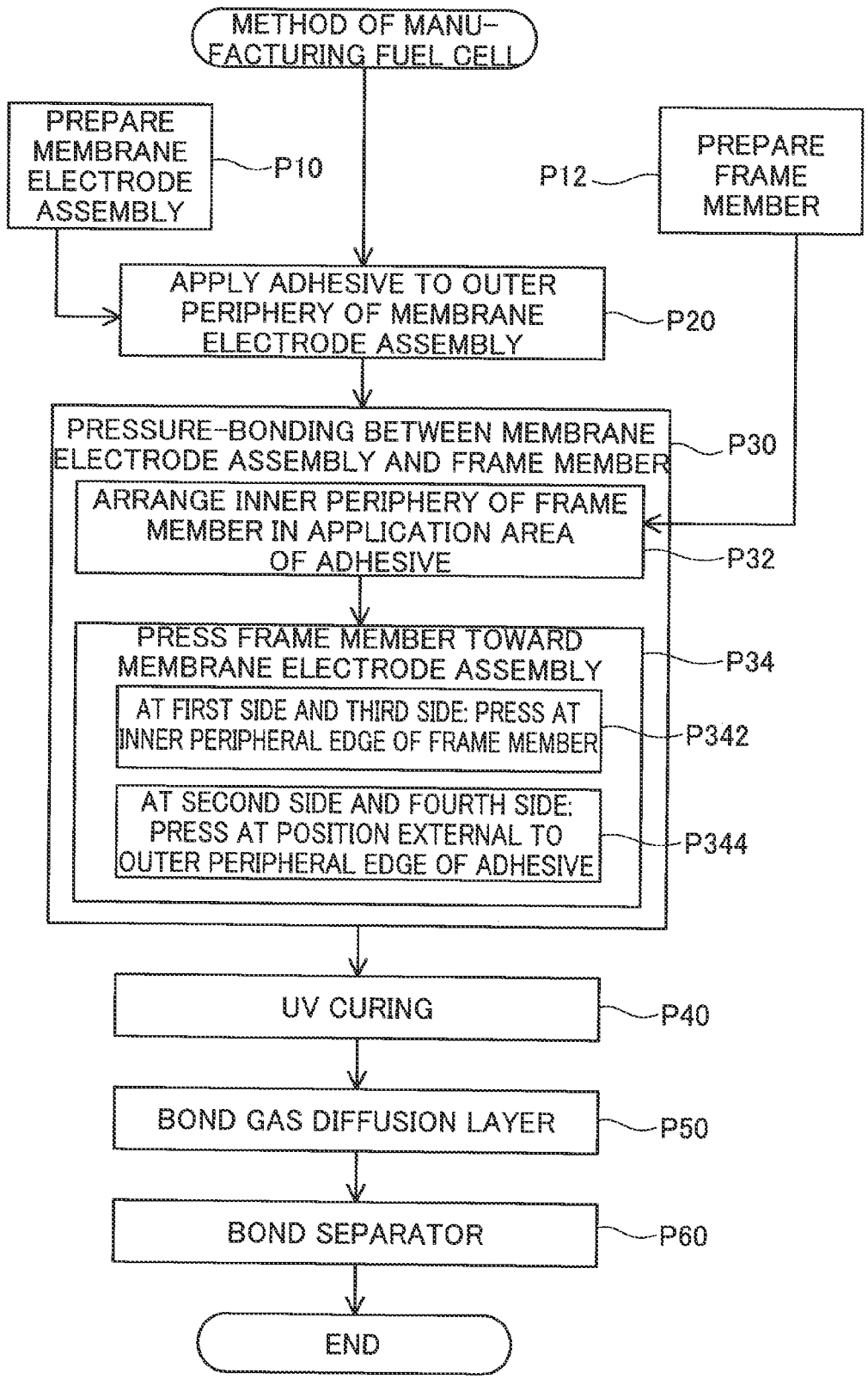
FIG. 2 is a manufacturing process chart showing a method of manufacturing the fuel cell.

FIG. 2 is a manufacturing process chart showing a method of manufacturing the fuel cell 200 of the embodiment. The membrane electrode assembly 20 is prepared (step P10). The membrane electrode assembly 20 prepared in step P10 may be replaced with a stack in which the anode-side gas diffusion layer 40 is bonded to the anode-side electrode catalyst layer 23 of the membrane electrode assembly 20.

Figure 3:
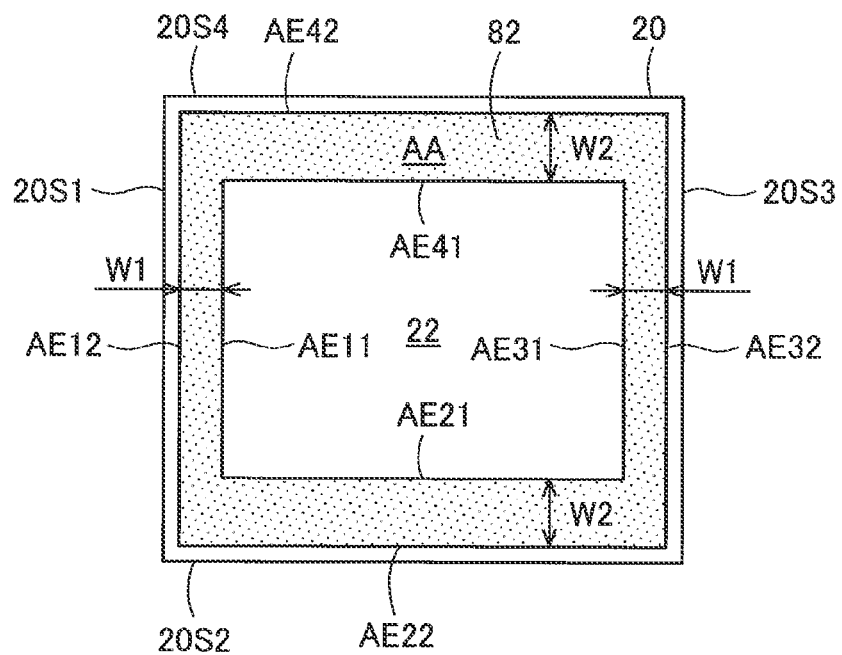
FIG. 3 is a plan view showing a membrane electrode assembly.

The membrane electrode assembly 20 and an area in which the adhesive 82 is applied on the membrane electrode assembly 20 will be described using FIG. 3. FIG. 3 is a plan view showing the membrane electrode assembly 20. FIG. 3 shows a cathode-side surface of the membrane electrode assembly 20, and the adhesive 82 is shown with hatching.

The membrane electrode assembly 20 of the embodiment has a substantially rectangular outer shape with four sides. A side of the membrane electrode assembly 20 intersecting a flow pathway of a cathode gas in a plane of the fuel cell 200 will also be called a first side 20S1. In addition to the first side 20S1, the membrane electrode assembly 20 has a second side 20S2 orthogonal to and continuous with the first side 20S1, a third side 20S3 orthogonal to and continuous with the second side 20S2, and a fourth side 20S4 with one end orthogonal to and continuous with the third side 20S3 and the other end orthogonal to and continuous with the first side 20S1. In the embodiment, as will be described later, the first side 20S1 and the third side 20S3 are arranged at the resin frame 80 in such a manner as to intersect the flow pathway of the cathode gas in a plane of the fuel cell 200. While the second side 20S2 and the fourth side 20S4 are arranged at the resin frame 80, these sides do not intersect the flow pathway of the cathode gas in a plane of the fuel cell 200. In addition to a rectangular shape, shapes applicable to the membrane electrode assembly 20 include various types of quadrangular shapes such as a parallelogram shape and a trapezoidal shape, and various types of polygonal shapes such as a triangular shape and a hexagonal shape. Various types of geometric shapes including at least the first side 20S1 and the second side 20S2 are applicable to the membrane electrode assembly 20. For example, a shape including a curve such as an arc in addition to the first side 20S1 and the second side 20S2 is applicable. As long as the first side 20S1 and the second side 20S2 are macroscopic lines, these sides may have curves of predetermined curvatures, for example.

The adhesive 82 is applied to the cathode-side outer periphery of the membrane electrode assembly 20 prepared in step P10 (step P20). The adhesive 82 is applied by a method such as screen printing, for example. According to the screen printing, the adhesive 82 on a mesh is squeezed onto the cathode-side surface of the membrane electrode assembly 20 with a squeegee and applied into a substantially uniform thickness.

An area in which the adhesive 82 is applied on the membrane electrode assembly 20 (herein after also called an "application area AA") corresponds to an outer periphery on the cathode-side surface. The application area AA has a shape corresponding to the outer shape of the membrane electrode assembly 20 and has sides corresponding to respective ones of the sides 20S1 to 20S4. The application area AA extends from the sides 20S1 to 20S4 corresponding to outer peripheral edges of the membrane electrode assembly 20 toward the center of the membrane electrode assembly 20, and includes an area on a surface of the electrolyte membrane 21 and an area on a surface of the cathode-side electrode catalyst layer 22. The shape of the application area AA may be changed, if appropriate, to conform to the shape of the resin frame 80. The application area AA may include an outer peripheral edge of the membrane electrode assembly 20.

The application area AA has predetermined widths at sides corresponding to respective ones of the sides 20S1 to 20S4 of the membrane electrode assembly 20. More specifically, the application area AA has a width W1 extending from an outer peripheral edge AE12 to an inner peripheral edge AE11 at a side corresponding to the first side 20S1 of the membrane electrode assembly 20, a width W2 extending from an outer peripheral edge AE22 to an inner peripheral edge AE21 at a side corresponding to the second side 20S2, a width W3 extending from an outer peripheral edge AE32 to an inner peripheral edge AE31 at a side corresponding to the third side 20S3, and a width W4 extending from an outer peripheral edge AE42 to an inner peripheral edge AE41 at a side corresponding to the fourth side 20S4. The width W1 and the width W3 are equal to each other, and the width W2 and the width W4 are equal to each other. In the embodiment, the width W2 is greater than the width W1, and the amount of the adhesive 82 applied per unit length along the side corresponding to the second side 20S2 is greater than the amount of the adhesive 82 applied per unit length along the side corresponding to the first side 20S1.

Figure 4:
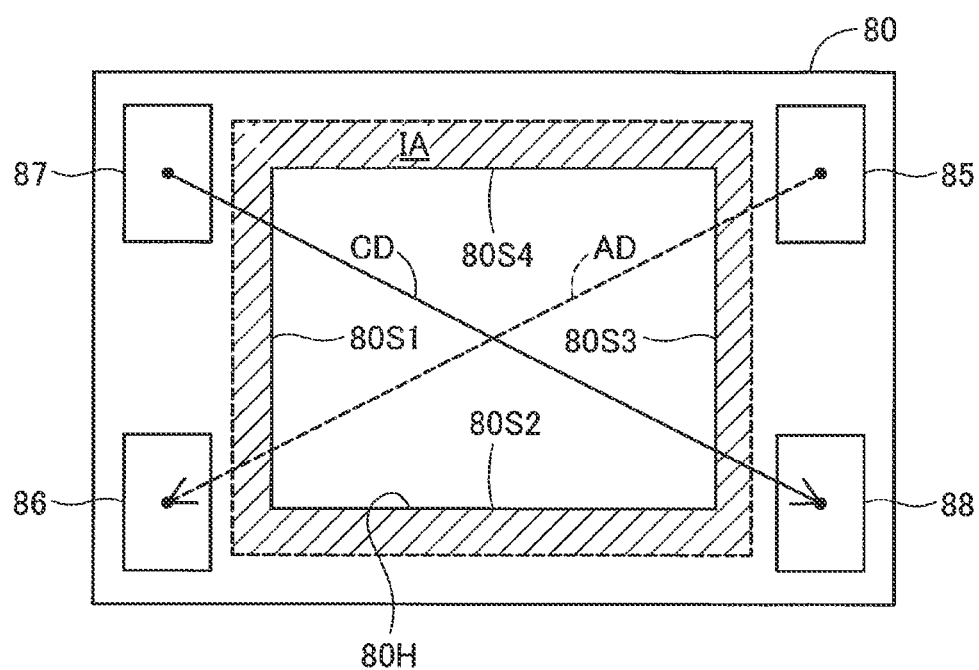
FIG. 4 is a plan view schematically showing a resin frame.

The resin frame 80 is prepared (step P12). FIG. 4 is a plan view schematically showing the resin frame 80. FIG. 4 shows a surface of the resin frame 80 corresponding to the cathode. At the center of the resin frame 80, the opening part 80H is formed for arrangement of the membrane electrode assembly 20.

The opening part 80H has an outer shape of a substantially rectangular shape corresponding to the outer shape of the membrane electrode assembly 20 and has sides corresponding to respective ones of the sides 20S1 to 20S4 of the membrane electrode assembly 20. A side of the opening part 80H corresponding to the first side 20S1 of the membrane electrode assembly 20 will also be called a first frame side 80S1. In addition to the first frame side 80S1, the opening part 80H has a second frame side 80S2 orthogonal to and continuous with the first frame side 80S1, a third frame side 80S3 orthogonal to and continuous with the second frame side 80S2, and a fourth frame side 80S4 with one end orthogonal to and continuous with the third frame side 80S3 and the other end orthogonal to and continuous with the first frame side 80S1. The frame sides 80S1 to 80S4 of the resin frame 80 are arranged to be matched with the sides 20S1 to 20S4 of the membrane electrode assembly 20 respectively. In addition to a rectangular shape, various shapes corresponding to the outer shape of the membrane electrode assembly 20 are applicable to the outer shape of the opening part 80H. The third side 20S3 of the membrane electrode assembly 20 and the third frame side 80S3 of the resin frame 80 have the same configurations as that of the first side 20S1 of the membrane electrode assembly 20 and that of the first frame side 80S1 of the resin frame 80 respectively. The fourth side 20S4 of the membrane electrode assembly 20 and the fourth frame side 80S4 of the resin frame 80 have the same configurations as that of the second side 20S2 of the membrane electrode assembly 20 and that of the second frame side 80S2 of the resin frame 80 respectively. Thus, explanation of the sides having the same configurations will be omitted.

Manifold holes 85, 86, 87, and 88 are formed at the outer periphery of the resin frame 80. In a fuel cell stack with a plurality of the fuel cells 200 stacked on each other, the manifold holes 85, 86, 87, and 88 function as flow paths for the reactive gases in a direction (hereinafter also called a "stacking direction") vertical to the plane direction of the fuel cell 200. The manifold holes 85 and 86 communicate with the fuel gas flow path 72 of the anode-side separator 70 and form a flow path for supply and discharge of the hydrogen gas to and from the fuel cell 200. FIG. 4 conceptually shows a flow AD of the hydrogen gas in a plane of the fuel cell 200. The manifold holes 87 and 88 communicate with the oxidizing gas flow path 62 of the cathode-side separator 60 and forms a flow path for supply and discharge of air to and from the fuel cell 200. FIG. 4 conceptually shows a flow CD of air in a plane of the fuel cell 200. To facilitate technical understanding, the flows CD and AD are illustrated as linear patterns in FIG. 4. However, flows of the reactive gases in a plane of the fuel cell 200 are appropriately settable, and the positions of the manifold holes 85, 86, 87, and 88 are appropriately settable in response to the flows of the reactive gas to be set, for example.

FIG. 4 shows a hatched inner periphery IA of the resin frame 80. The inner periphery IA means an area surrounding the opening part 80H of the resin frame 80. The "area surrounding the opening part 80H" means an area on the resin frame 80 covered in a range from an intermediate position between an outer peripheral edge and an inner peripheral edge of the resin frame 80 to the opening part 80H. The inner periphery IA is in butting contact with the adhesive 82 on the membrane electrode assembly 20.

In a pressure-bonding step, the membrane electrode assembly 20 to which the adhesive 82 is applied in step P20 and the resin frame 80 prepared in step P12 are pressure-bonded to each other (step P30). More specifically, the inner periphery IA of the resin frame 80 is arranged on the application area AA of the membrane electrode assembly 20 in which the adhesive 82 is applied (step P32). A step of pressure-bonding between the third side 20S3 of the membrane electrode assembly 20 and the third frame side 80S3 of the resin frame 80 is performed in the same way as a step of pressure-bonding between the first side 20S1 and the first frame side 80S1. Also, a step of pressure-bonding between the fourth side 20S4 of the membrane electrode assembly 20 and the fourth frame side 80S4 of the resin frame 80 is performed in the same way as a step of pressure-bonding between the second side 20S2 and the second frame side 80S2. Thus, explanation of the pressure-bonding steps performed in the same ways will be omitted from the following description.

Figure 5:
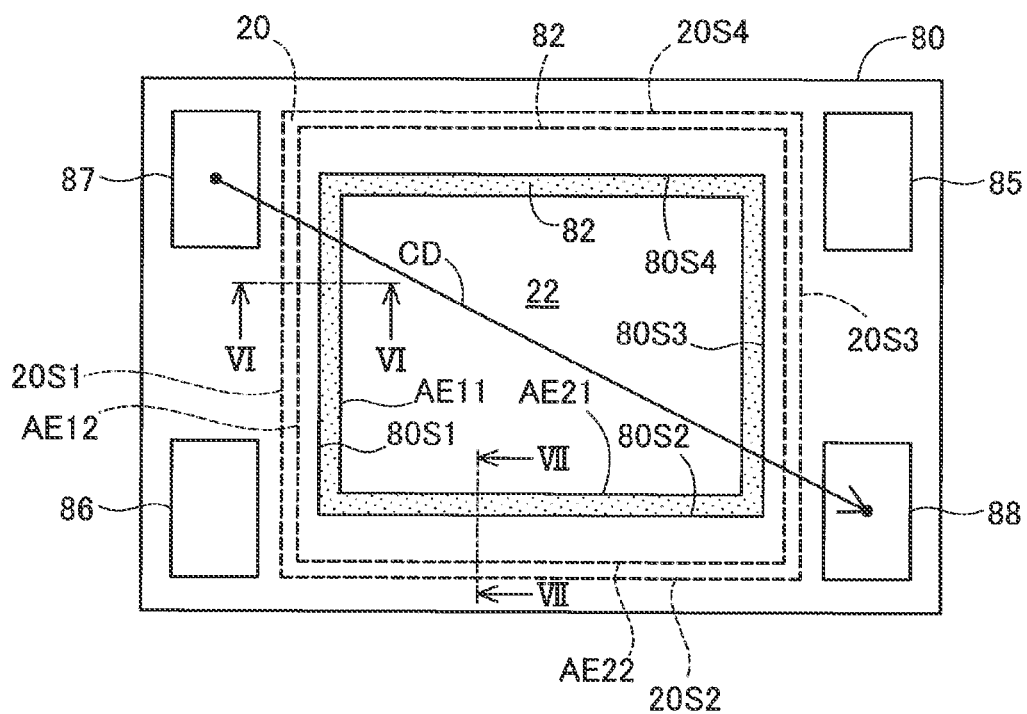
FIG. 5 is a plan view showing the resin frame arranged at the membrane electrode assembly.

FIG. 5 is a plan view showing the resin frame 80 arranged on the membrane electrode assembly 20 in step P32. FIG. 5 shows the surface of the resin frame 80 on the membrane electrode assembly 20 corresponding to the cathode side. As shown in FIG. 5, the first side 20S1 of the membrane electrode assembly 20 is arranged at a position intersecting the flow CD of the cathode gas in a plane of the fuel cell 200, and the second side 20S2 of the membrane electrode assembly 20 is arranged at a position not intersecting the flow CD.

The resin frame 80 is pressed toward the membrane electrode assembly 20 (step P34). In step P34, the resin frame 80 on the adhesive 82 is pressed toward the membrane electrode assembly 20 by a press machine 90. A pressure of the press by the press machine 90 may be set to be equal to or less than 1 MPa. At the first frame side 80S1 of the resin frame 80, the resin frame 80 is pressed at an inner peripheral edge of the resin frame 80 (step P342). At the second frame side 80S2 of the resin frame 80, the resin frame 80 is pressed at a position corresponding to an external position to an outer peripheral edge of the adhesive 82 applied to the application area AA (step P344).

Figure 6:
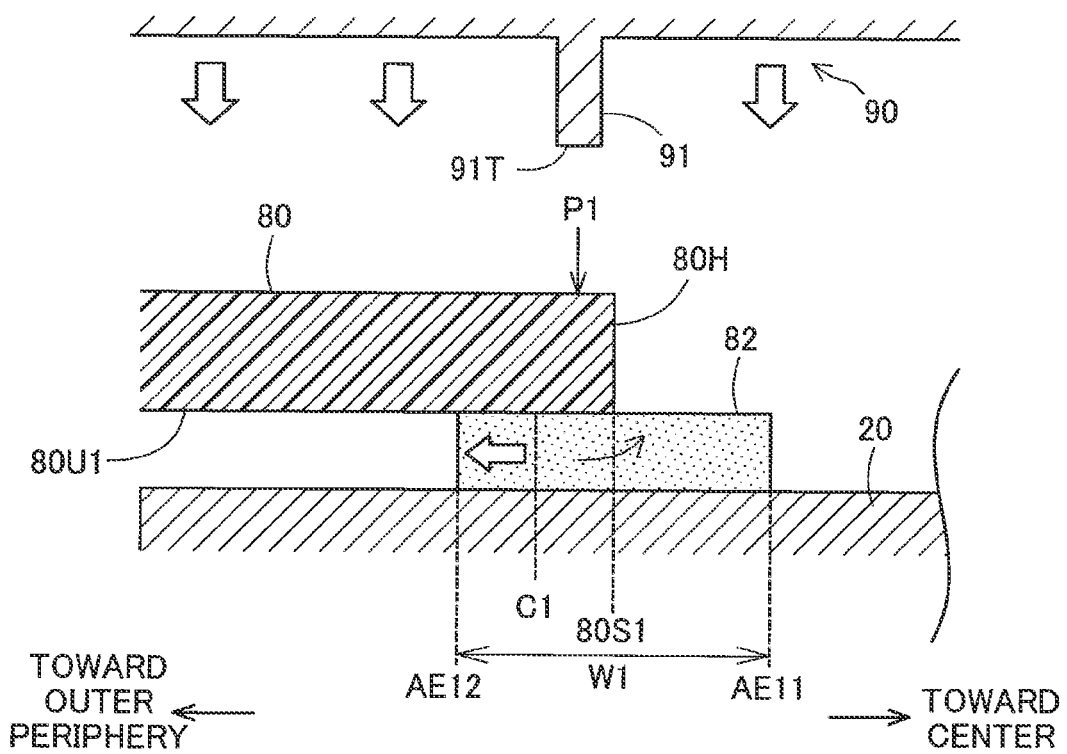
FIG. 6 is a cross-sectional view taken at positions VI-VI in FIG. 5.

FIG. 6 is a cross-sectional view taken at positions VI-VI in FIG. 5. FIG. 6 shows the first frame side 80S1 of the resin frame 80 and its vicinity, and the press machine 90. The press machine 90 includes a first protrusion 91 protruding in a pressing direction, namely, in a direction from the resin frame 80 toward the membrane electrode assembly 20. The first protrusion 91 has a substantially rectangular cross-sectional shape and has a tip surface 91T with which the resin frame 80 is to be pressed at a predetermined position on the resin frame 80. The first protrusion 91 has a single elongated shape extending over the first frame side 80S1 of the resin frame 80 entirely and is used for pressing at the first frame side 80S1 as a whole.

As shown in FIG. 6, at the first frame side 80S1 of the resin frame 80, the resin frame 80 is pressed with the first protrusion 91 at an inner peripheral edge, namely, at the first frame side 80S1 of the resin frame 80 in step P342. The "inner peripheral edge of the resin frame 80" includes an area in the vicinity of the inner peripheral edge of the resin frame 80. As shown in FIG. 6, in the embodiment, the resin frame 80 is pressed at a position P1 included in a range from an intermediate position C1 between the outer peripheral edge AE12 of the adhesive 82 and the first frame side 80S1 to the first frame side 80S1. As a result of the pressing at the position P1, much of the adhesive 82 flows toward the outer periphery of the resin frame 80 along a lower surface 80U1 of the resin frame 80 being pressed, and part of the adhesive 82 flows closer to the center of the resin frame 80 than the first frame side 80S1. To facilitate flow of the adhesive 82 toward the outer periphery of the resin frame 80, after the pressing at the position P1, the resin frame 80 may be pressed sequentially at arbitrary positions such as the position C1 closer to the outer periphery of the resin frame 80 than the position P1.

Figure 7:
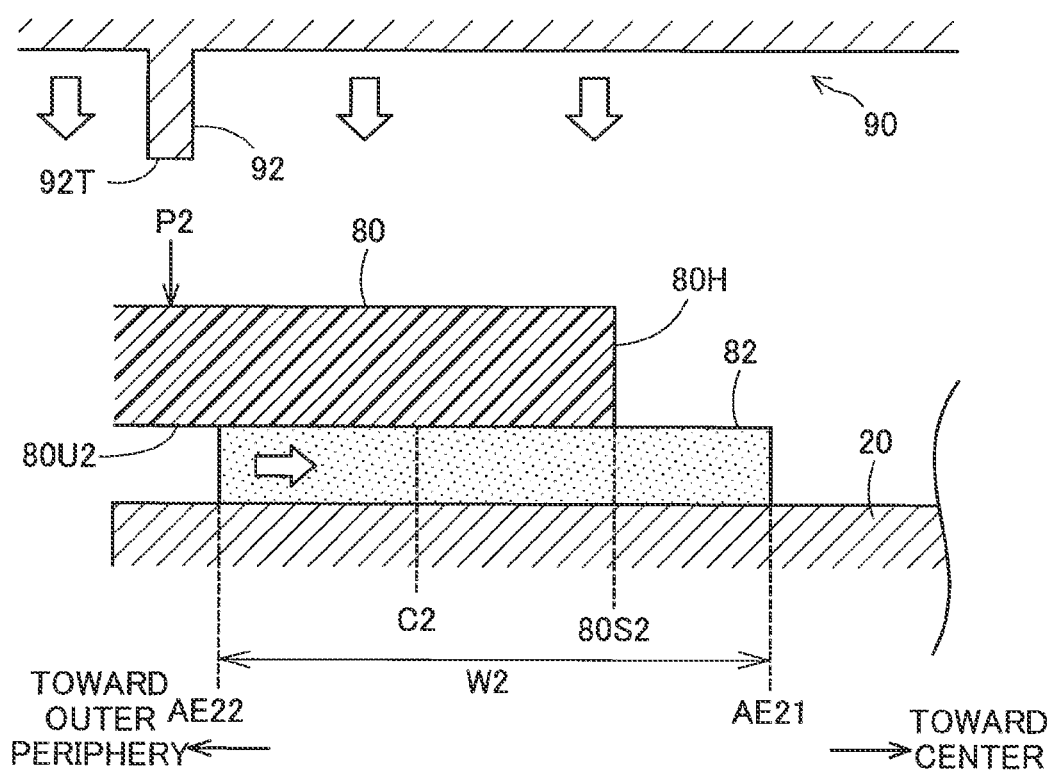
FIG. 7 is a cross-sectional view taken at positions VII-VII in FIG. 5.

FIG. 7 is a cross-sectional view taken at positions VII-VII in FIG. 5. FIG. 7 shows the second frame side 80S2 of the resin frame 80 and its vicinity, and a second protrusion 92 of the press machine 90. The second protrusion 92 has a substantially rectangular cross-sectional shape and has a tip surface 92T with which the resin frame 80 is to be pressed at a predetermined position on the resin frame 80. The second protrusion 92 has a single elongated shape extending over the second frame side 80S2 of the resin frame 80 entirely and is used for pressing at the second frame side 80S2 as a whole.

As shown in FIG. 7, at the second frame side 80S2 of the resin frame 80, the resin frame 80 is pressed with the second protrusion 92 at a position P2 corresponding to a position on the resin frame 80 closer to the outer periphery of the resin frame 80 than the outer peripheral edge AE22 of the adhesive 82 in step P344. As a result of the pressing at the position P2, much of the adhesive 82 flows toward the inner periphery of the resin frame 80 along a lower surface 80U2 of the resin frame 80. To facilitate flow of the adhesive 82 toward the inner periphery of the resin frame 80, after the pressing at the position P2, the resin frame 80 may be pressed sequentially at arbitrary positions closer to the inner periphery of the resin frame 80 than the position P2. For example, the resin frame 80 may be pressed at a position C2 that is intermediate position between the outer peripheral edge AE22 of the adhesive 82 and the second frame side 80S2.

As shown in FIG. 2, a stack obtained by step P30 is irradiated with ultraviolet light to cure the adhesive 82 (step P40). The UV irradiation may be performed using a general UV irradiator. As a result of the curing of the adhesive 82 with the UV irradiation, the adhesive member is formed. The gas diffusion layers 30 and 40 are bonded to the opposite surfaces of a stack obtained by step P40 (step P50). Hot-pressing is used for the bonding of the gas diffusion layers 30 and 40, for example. If a stack in which the anode-side gas diffusion layer 40 is bonded to the anode-side electrode catalyst layer 23 of the membrane electrode assembly 20 is used instead of the membrane electrode assembly 20 prepared in step P10, only the cathode-side gas diffusion layer 30 may be bonded. A stack obtained by step P50 is caught between the separators 60 and 70 in a pair and is bonded to the separators 60 and 70 by hot-pressing (step P60). As a result of implementation of step P60, the fuel cell 200 is obtained.

Figure 8:
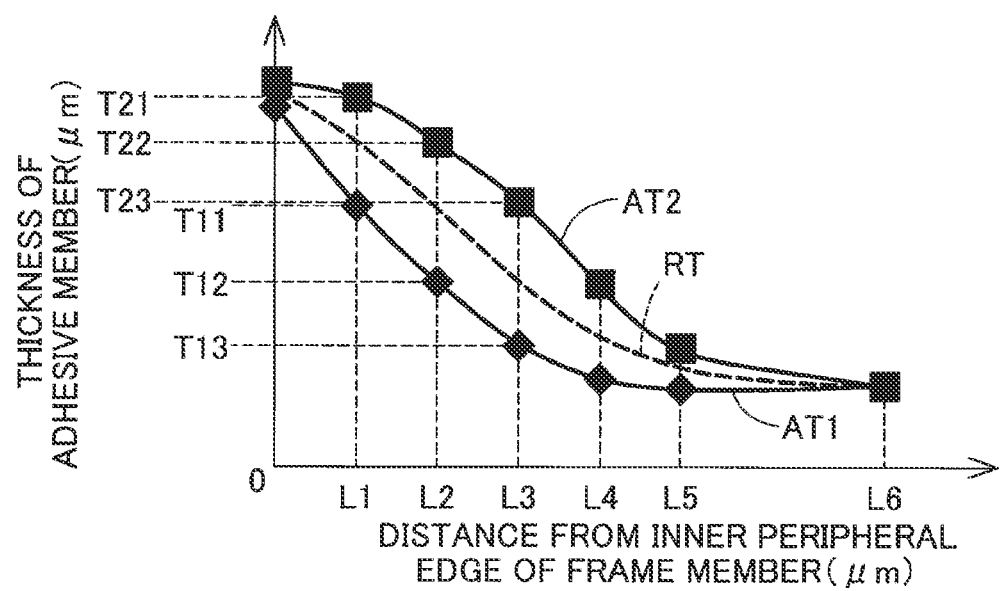
FIG. 8 is a graph showing a thickness distribution of an adhesive member of the fuel cell.

FIG. 8 is a graph showing a thickness distribution of the adhesive member of the fuel cell 200 manufactured by the method of manufacturing the fuel cell 200 of the embodiment. In FIG. 8, a vertical axis shows the thickness of the adhesive member from a surface of the membrane electrode assembly 20, and a horizontal axis shows a distance of separation from an inner peripheral edge of the resin frame 80, namely, from each of the frame sides 80S1 and 80S2 of the resin frame 80 toward the center of the resin frame 80. FIG. 8 shows an average distribution AT1 of the thickness of the adhesive member in the vicinity of the first frame side 80S1 of the resin frame 80, and an average distribution AT2 of the thickness of the adhesive member in the vicinity of the second frame side 80S2. FIG. 8 further shows a distribution RT as a reference example. The distribution RT corresponds to an average distribution of the thickness of the adhesive member resulting from pressing at the position C1 at the first frame side 80S1 of the resin frame 80 shown in FIG. 6. The thickness of the adhesive member at a position separated from each of the frame sides 80S1 and 80S2 toward the center by a distance L6 is substantially equal to the application thickness of the adhesive 82.

As shown in FIG. 8, in a range in which the first frame side 80S1 as an inner peripheral edge is separated toward the center by a distance from L1 to L6, the thickness of the adhesive member is less in the distribution AT1 than in the distribution RT. Specifically, at the first frame side 80S1 of the resin frame 80, the resin frame 80 is pressed at the position P1 closer to the center than the position C1 in the pressure-bonding step to suppress flow of the adhesive 82 toward the center of the resin frame 80. As shown in FIG. 8, in a range in which the second frame side 80S2 as an inner peripheral edge is separated toward the center by a distance from L1 to L6, the thickness of the adhesive 82 is greater in the distribution AT2 than in the distribution RT. Specifically, at the second frame side 80S2 of the resin frame 80, the resin frame 80 is pressed at the position P2 closer to the outer periphery than the outer peripheral edge AE22 of the adhesive 82 in the pressure-bonding step to facilitate flow of the adhesive 82 toward the center of the resin frame 80.

As shown in FIG. 8, a maximum difference is generated between the thickness of the adhesive member corresponding to the first side 20S1 and the thickness of the adhesive member corresponding to the second side 20S2 at a position separated from each of the frame sides 80S1 and 80S2 toward the center by the distance L3. At the position of the distance L3, a thickness average T23 in the distribution AT2 is 2.13 times a thickness average T13 in the distribution AT1. At a position separated from each of the frame sides 80S1 and 80S2 toward the center by the distance L1, a thickness average T21 in the distribution AT2 is 1.42 times a thickness average T11 in the distribution AT1. At a position separated from each of the frame sides 80S1 and 80S2 toward the center by the distance L2, a thickness average T22 in the distribution AT2 is 1.71 times a thickness average T12 in the distribution AT1. For increasing the strength of the second side 20S2 of the membrane electrode assembly 20 sufficiently while suppressing increase in pressure loss in a gas flow path in a plane of the fuel cell 200 at the first side 20S1 of the membrane electrode assembly 20, the thickness in the distribution AT2 is preferably equal to or greater than 1.7 times the thickness in the distribution AT1 at the position separated from each of the frame sides 80S1 and 80S2 toward the center by the distance L3. More preferably, for increasing the strength of the second side 20S2 of the membrane electrode assembly 20 to a greater extent, the thickness in the distribution AT2 is equal to or greater than twice the thickness in the distribution AT1.

Figure 9:
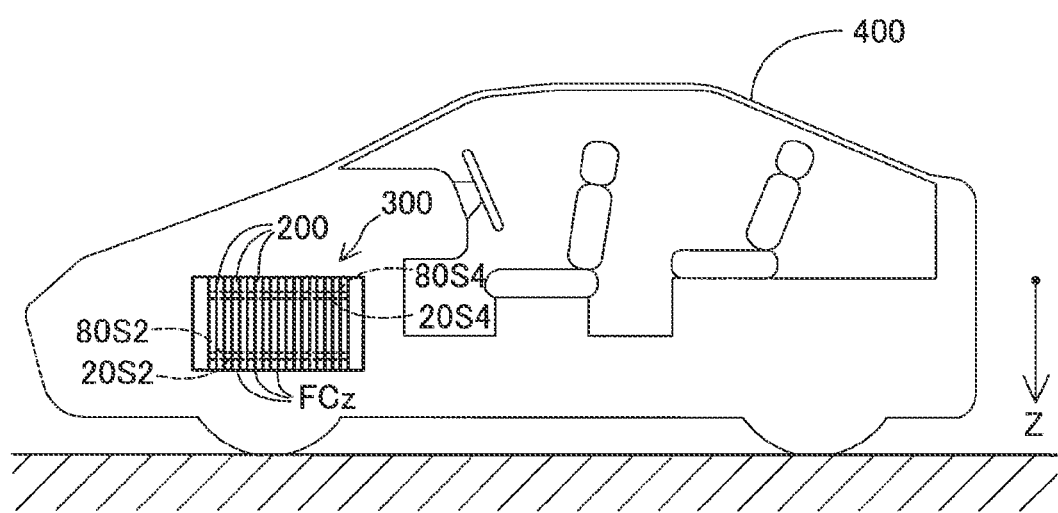
FIG. 9 is an explanatory view showing a fuel cell stack mounted on a fuel cell vehicle.

FIG. 9 is an explanatory view showing a fuel cell stack 300 mounted on a fuel cell vehicle 400. FIG. 9 shows a Z direction parallel to a vertical direction. The fuel cell stack 300 shown in FIG. 9 is a stack of a plurality of the fuel cells 200 obtained by the method of manufacturing the fuel cell 200 of the embodiment. In the fuel cell 200, water is produced as a result of electrochemical reaction occurring during power generation. The produced water is prone to move by gravity toward a lower part of the membrane electrode assembly 20 in the vertical direction. If the fuel cell vehicle 400 is exposed to a low-temperature environment, for example, the produced water accumulated in the lower part in the vertical direction may freeze to apply stress on the electrolyte membrane 21 of the membrane electrode assembly 20, causing a likelihood of damage on the electrolyte membrane 21.

As shown in FIG. 9, in each fuel cell 200 in the fuel cell stack 300, the second frame side 80S2 of the resin frame 80 and the second side 20S2 of the membrane electrode assembly 20 are arranged at positions corresponding to a lower end FCz of each fuel cell 200 in the Z direction while the fuel cell 200 is mounted on the fuel cell vehicle 400. Namely, the fuel cell stack 300 is mounted on the fuel cell vehicle 400 in such a manner as to locate the second frame side 80S2 of the frame sides 80S1 to 80S4 of the resin frame 80 and to locate the second side 20S2 of the sides 20S1 to 20S4 of the membrane electrode assembly 20 at lower positions of the fuel cell stack 300 in the vertical direction.

As described above, according to the fuel cell 200 of the embodiment, the thickness of the adhesive member arranged at the inner peripheral edge at the second frame side 80S2 of the resin frame 80 corresponding to the second side 20S2 of the membrane electrode assembly 20 not intersecting the flow CD of the cathode gas is greater than the thickness of the adhesive member arranged at the inner peripheral edge at the first frame side 80S1 of the resin frame 80 corresponding to the first side 20S1 intersecting the flow CD of the cathode gas. This makes it possible to increase the strength of the second side 20S2 of the membrane electrode assembly 20 while reducing the occurrence of a hindrance to passage of gas in a plane of the fuel cell 200.

According to the fuel cell 200 of the embodiment, the second side 20S2 of the membrane electrode assembly 20 is arranged at a position adjacent to the lower end FCz of the fuel cell 200 in the vertical direction while the fuel cell 200 is mounted on the fuel cell vehicle 400. This achieves increased strength at a lower part of the membrane electrode assembly 20 in the vertical direction. This reduces the occurrence of a problem that the electrolyte membrane 21 will be damaged if the fuel cell vehicle 400 with the fuel cell 200 of the embodiment is exposed to a low-temperature environment and produced water accumulated in the lower part in the vertical direction freezes.

According to the fuel cell 200 of the embodiment, at the position separated from each of the frame sides 80S1 and 80S2 toward the center of the resin frame 80 by the distance L3 and at which a maximum difference is generated between the thickness of the adhesive member closer to the center than the first frame side 80S1 and the thickness of the adhesive member closer to the center than the second frame side 80S2, the thickness of the adhesive member corresponding to the second frame side 80S2 is equal to or greater than 1.7 times the thickness of the adhesive member corresponding to the first frame side 80S1. This makes it possible to increase the strength of the second side 20S2 of the membrane electrode assembly 20 sufficiently while suppressing increase in pressure loss in a gas flow path at the first side 20S1 of the membrane electrode assembly 20.

According to the method of manufacturing the fuel cell 200 of the embodiment, at the second frame side 80S2 of the resin frame 80 corresponding to the second side 20S2 of the membrane electrode assembly 20, the resin frame 80 is pressed at the position P2 external to the outer peripheral edge AE22 of the adhesive 82 in step P344. This allows increase in the thickness of the adhesive member arranged at the second side 20S2 of the membrane electrode assembly 20 to obtain the fuel cell 200 with increased strength at the second side 20S2 of the membrane electrode assembly 20.

According to the method of manufacturing the fuel cell 200 of the embodiment, in step P20, the amount of the adhesive 82 applied per unit length along a side corresponding to the second side 20S2 is greater than the amount of the adhesive 82 applied per unit length along a side corresponding to the first side 20S1. This makes it possible to increase the strength of the second side 20S2 of the membrane electrode assembly 20 sufficiently while suppressing increase in pressure loss in a gas flow path on a surface at the first side 20S1 of the membrane electrode assembly 20.

According to the fuel cell 200 of the embodiment, at the first frame side 80S1 of the resin frame 80, the resin frame 80 is pressed at the inner peripheral edge in step P342. Thus, the adhesive member at the first side 20S1 of the membrane electrode assembly 20 is unlikely to be increased in thickness. This makes it possible to suppress increase in pressure loss in a gas flow path in a plane of the fuel cell 200 while increasing the strength of the second side 20S2 of the membrane electrode assembly 20.

B. Other Embodiments (B1) In the example described in the foregoing embodiment, the adhesive 82 is arranged on the cathode-side surface of the membrane electrode assembly 20. By contrast, the adhesive 82 may be arranged on an anode-side surface of the membrane electrode assembly 20. In this configuration, of the sides 20S1 to 20S4 of the membrane electrode assembly 20, a side intersecting the flow AD of an anode gas may be defined as the first side 20S1, and a side not intersecting the flow AD of the anode gas may be defined as the second side 20S2.

(B2) In the foregoing embodiment, the cross-sectional shape of each of the first protrusion 91 and the second protrusion 92 of the press machine 90 is not limited to a rectangular shape but it may be various types of quadrangular shapes such as a trapezoidal shape or may be various types of pyramidal shapes without the surface 91T or the surface 92T. Each of the first protrusion 91 and the second protrusion 92 is not limited to a single elongated shape extending over the first frame side 80S1 or the second frame side 80S2 entirely but may be a plurality of aligned protrusions provided to the first frame side 80S1 or the second frame side 80S2. The first protrusion 91 and the second protrusion 92 may have shapes differing from each other.

(B3) In the foregoing embodiment, step P342 and step P344 are performed simultaneously. Alternatively, step P342 and step P344 may be performed sequentially in any order. For example, if the thickness of the adhesive member at the first side 20S1 of the membrane electrode assembly 20 is sufficiently small to cause no influence on pressure loss in the flow CD of the cathode gas, step P342 may be omitted and only step P344 may be performed. This also achieves increased strength at the second side 20S2 of the membrane electrode assembly 20.

This disclosure is not limited to the foregoing embodiment but is feasible in various configurations within a range not deviating from the substance of this disclosure. For example, technical features in the embodiments may be replaced or combined, where appropriate, with the intention of solving some or all of the aforementioned problems or achieving some or all of the aforementioned effects. Unless being described as absolute necessities in this specification, these technical features may be deleted, where appropriate. For example, this disclosure may be realized in the following configurations.

(1) According to one aspect of this disclosure, a fuel cell is provided. The fuel cell includes: a membrane electrode assembly having a flat plate shape, the membrane electrode assembly including an electrolyte membrane and an electrode catalyst layer, the membrane electrode assembly having a first side and a second side different from the first side, the first side intersecting a flow pathway of a reactive gas in a plane of the fuel cell; a frame member having a flat plate shape, the frame member including an opening part configured to arrange the membrane electrode assembly, the opening part having a first frame side corresponding to arrangement of the first side and a second frame side corresponding to arrangement of the second side; and an adhesive member configured to bond an outer periphery part of the membrane electrode assembly and an inner periphery part of the frame member. The thickness of the adhesive member in an area from an inner peripheral edge at the second frame side toward a center of the frame member may be greater than the thickness of the adhesive member in an area from an inner peripheral edge at the first frame side toward the center of the frame member. According to the fuel cell of this aspect, the adhesive member arranged at a position corresponding to the second side of the membrane electrode assembly has a greater thickness than the adhesive member arranged at a position corresponding to the first side of the membrane electrode assembly intersecting the flow pathway of the reactive gas in a plane of the fuel cell. This makes it possible to increase the strength of the second side of the membrane electrode assembly while reducing the occurrence of a hindrance to passage of gas in a plane of the fuel cell.

(2) In the fuel cell of the foregoing aspect, the second side may be arranged on the downside of the first side in the fuel cell while the fuel cell is mounted on a fuel cell vehicle. The fuel cell of this aspect achieves increased strength at a lower part of the membrane electrode assembly of the fuel cell in the vertical direction while the fuel cell is mounted on the fuel cell vehicle. This reduces the occurrence of a problem that the electrolyte membrane will be damaged if the fuel cell vehicle with the fuel cell of this aspect is exposed to a low-temperature environment and produced water accumulated in the lower part in the vertical direction freezes.

(3) In the fuel cell of the foregoing aspect, when a maximum difference between the thickness of the adhesive member at a position separated from the inner peripheral edge at the second frame side toward the center by a predetermined distance and the thickness of the adhesive member at a position separated from the inner peripheral edge at the first frame side toward the center by the predetermined distance, the thickness of the adhesive member at the position separated from the inner peripheral edge at the second frame side toward the center by the predetermined distance may be equal to or greater than 1.7 times the thickness of the adhesive member at the position separated from the inner peripheral edge at the first frame side toward the center by the predetermined distance. The fuel cell of this aspect makes it possible to increase the strength of the second side of the membrane electrode assembly sufficiently while suppressing increase in pressure loss in a gas flow path in a plane of the fuel cell at the first side of the membrane electrode assembly intersecting the flow pathway of the reactive gas.

(4) According to another aspect of this disclosure, a method of manufacturing a fuel cell is provided. The method of manufacturing the fuel cell includes: preparing a membrane electrode assembly having a flat plate shape, the membrane electrode assembly including an electrolyte membrane and an electrode catalyst layer, the membrane electrode assembly having a first side intersecting a flow pathway of a reactive gas in a plane of the fuel cell, and a frame member having a flat plate shape, the frame member including an opening part configured to arrange the membrane electrode assembly, the opening part having a first frame side corresponding to an arrangement of the first side and a second frame side corresponding to an arrangement of the second side; applying an adhesive to an application area at an outer periphery of the membrane electrode assembly; and pressure-bonding the frame member and the membrane electrode assembly, wherein the frame member may be pressed at an external position to an outer peripheral edge of the application area at the second frame side. According to the method of manufacturing the fuel cell of this aspect, at the second frame side corresponding to the second side of the membrane electrode assembly, the frame member is pressed at the position corresponding to the external position to the outer peripheral edge of the adhesive. This allows increase in the thickness of the adhesive member arranged at the second side of the membrane electrode assembly to obtain the fuel cell with increased strength at the second side of the membrane electrode assembly.

(5) In the method of manufacturing the fuel cell of the foregoing aspect, wherein the amount of the adhesive applied to an application area corresponding to the second side per unit length of the application area may be greater than the amount of the adhesive applied to an application area corresponding to the first side per unit length of the application area corresponding to the first side. According to the method of manufacturing the fuel cell of this aspect, the amount of the adhesive applied to the application area corresponding to the second side is greater than the amount of the adhesive applied to the application area corresponding to the first side of the membrane electrode assembly intersecting the flow pathway of the reactive gas. This makes it possible to increase the strength of the second side of the membrane electrode assembly sufficiently while suppressing increase in pressure loss in a gas flow path in a plane of the fuel cell at the first side of the membrane electrode assembly intersecting the flow pathway of the reactive gas.

(6) In the method of manufacturing the fuel cell of the foregoing aspect, wherein the frame member may be pressed at an inner peripheral edge of the frame member at the first frame side. According to the method of manufacturing the fuel cell of this aspect, the frame member is pressed at the inner peripheral edge of the frame member corresponding to the side of the membrane electrode assembly intersecting the flow pathway of the reactive gas. Thus, the adhesive member at the first side of the membrane electrode assembly intersecting the flow pathway of the reactive gas is unlikely to be increased in thickness, thereby making it possible to suppress increase in pressure loss in a gas flow path in a plane of the fuel cell. This disclosure is feasible in various aspects other than a fuel cell and a method of manufacturing a fuel cell. For example, this disclosure is feasible in aspects including a membrane electrode assembly, a structure with a membrane electrode assembly and a frame member, a device for manufacturing a fuel cell, a fuel cell vehicle with a fuel cell, a method of manufacturing a fuel cell vehicle, a method of controlling a device for manufacturing a fuel cell, a computer program for realizing the control method, and a non-transitory recording medium storing the computer program.

What is claimed is:

1. A fuel cell comprising:
   a membrane electrode assembly having a flat plate shape, the membrane electrode assembly including an electrolyte membrane and an electrode catalyst layer, the membrane electrode assembly having a first side and a second side different from the first side, the first side intersecting a flow pathway of a reactive gas in a plane of the fuel cell;
   a frame member having a flat plate shape, the frame member including an opening part configured to arrange the membrane electrode assembly, the opening part having a first frame side corresponding to arrangement of the first side and a second frame side corresponding to arrangement of the second side; and
   an adhesive member configured to bond an outer periphery part of the membrane electrode assembly and an inner periphery part of the frame member, wherein
   the thickness of the adhesive member in an area from an inner peripheral edge at the second frame side toward a center of the frame member is greater than the thickness of the adhesive member in an area from an inner peripheral edge at the first frame side toward the center of the frame member, the thickness of the adhesive member is a value in a direction vertical to a plane direction of the fuel cell.

2. The fuel cell according to claim 1, wherein
   the second side is arranged on the downside of the first side in the fuel cell while the fuel cell is mounted on a fuel cell vehicle.

3. The fuel cell according to claim 1, wherein
   when a maximum difference between the thickness of the adhesive member at a position separated from the inner peripheral edge at the second frame side toward the center by a predetermined distance and the thickness of the adhesive member at a position separated from the inner peripheral edge at the first frame side toward the center by the predetermined distance,
   the thickness of the adhesive member at the position separated from the inner peripheral edge at the second frame side toward the center by the predetermined distance is equal to or greater than 1.7 times the thickness of the adhesive member at the position separated from the inner peripheral edge at the first frame side toward the center by the predetermined distance.

* * * * *